Nov. 6, 1945. A. I. ERICSSON 2,388,609
AUTOMATIC CAMERA-DIAPHRAGM ADJUSTER
Filed May 17, 1943
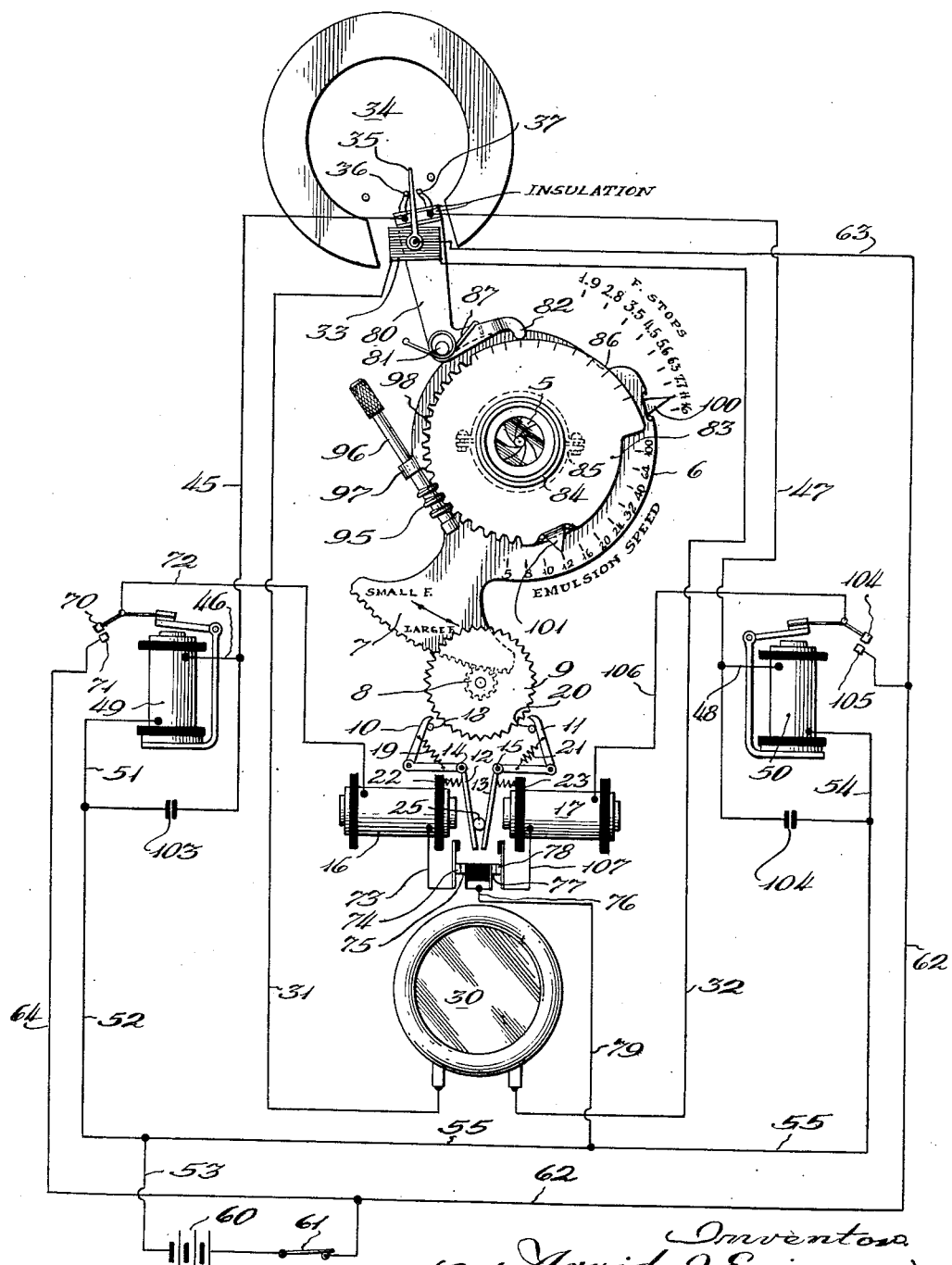

Patented Nov. 6, 1945

2,388,609

UNITED STATES PATENT OFFICE 2,388,609

AUTOMATIC CAMERA-DIAPHRAGM ADJUSTER

Arvid I. Ericsson, Chicago, Ill.

Application May 17, 1943, Serial No. 487,257

7 Claims. (Cl. 95—64)

My invention relates to automatic camera-diaphragm adjusters. That is, it relates to mechanism for automatically varying the size of the iris diaphragm opening of a camera in accordance with variations in light intensity so that substantial uniformity of exposure may be secured.

Although applicable to so-called "still picture" cameras, the invention is likely to have its greatest utility in conjunction with moving picture cameras, since in the operation of the latter, the necessity for or desirability of continuity during the filming of some particular scene or occurrence may render impossible manual diaphragm adjustment for change of light intensity. Thus, for example, during the "taking" of a parade in the open air, the passage of clouds across the sun, resulting in greater or lesser and possibly frequent increases and decreases in light intensity, or desirable movement of the camera, which may result in shifting of background from light to dark objects and vice versa, makes one diaphragm "setting" incapable of producing uniform exposure; and of course, continuity is lost if the "taking" is interrupted in order to permit manual adjustment of the iris opening.

The principal object of my invention is to provide a reliable automatic adjustment of diaphragm so that the iris opening is expanded and contracted as the light intensity decreases and increases.

Another object is to provide an automatic adjuster which can be easily and quickly adapted to different ranges of diaphragm opening so as to accommodate itself to different conditions of operation, such as different film-emulsion speeds, shifting between color and black and white pictures, and differences in general or overall environment, such for example as the marked contrast between taking a picture in dense woods and of a snow scene on a generally sunny day.

Another object is to provide automatic adjustment mechanism which, although controlled by a photoelectric cell, derives the power for operating the diaphragm from a different source.

A further object is to provide mechanism incorporating elements of currently available equipment, such as commercial photoelectric cells, ordinary flashlight batteries and relays.

Other objects and advantages will hereinafter appear.

The accompanying drawing shows, more or less diagrammatically, a typical embodiment of my invention.

In general, the preferred embodiment of my adjuster includes a photoelectric cell, which is mounted to be influenced by the same light conditions as the camera lens or film, a relay, preferably of the galvanometer type, controlled by the photoelectric cell in accordance with changes in the intensity of light acting upon the cell, step-by-step mechanism for selectively actuating the diaphragm so that its opening may be contracted or expanded as conditions require, and relays and electrical circuits whereby the response of the galvanometer to the varying intensity of light acting upon the photoelectric cell causes the step-by-step mechanism to operate in one direction or the other, depending upon whether the light diminishes or increases in intensity. There may also be provided a manual adjustment whereby the range of automatic expansion and contraction of the diaphragm opening may be shifted to accommodate the automatic movements of the diaphragm to different general conditions, such as the previously mentioned differences in film-emulsion speeds, etc.

Referring now to the drawing, the size of the iris or light opening of the camera may be changed and governed by the usual diaphragm leaves 5 and an actuating ring 6. In a manner well known in the art, and consequently which needs no illustration or explanation, the clockwise and counterclockwise rotation of ring 6 effects movements of the diaphragm leaves to contract or enlarge the central lens or iris opening defined by them. Diaphragm ring 6 is provided with a gear sector 7, the teeth of which mesh with the teeth of a pinion 8 so that rotation of the pinion in one direction or the other causes the diaphragm ring to move correspondingly, either to enlarge or to contract the iris opening in the ordinary manner. The shaft of pinion 8 has a ratchet wheel 9 rigidly secured thereto. This ratchet wheel 9 may be engaged and rotated step-by-step either clockwise or counterclockwise by pawls 10 and 11, respectively. Pawls 10 and 11 are pivotally carried on bell crank armature levers 12 and 13, respectively, which are mounted upon fixed pivots 14 and 15, and acted upon by electromagnets 16 and 17, respectively. A pin 18, against which a tension spring 19 biases pawl 10, guides the movements of pawl 10; and in like manner a pin 20 against which a tensioning spring 21 biases pawl 11 guides the movements of pawl 11. Compression springs 22 and 23 bias armature levers 12 and 13, respectively, against the attraction of their respective electromagnets. When the electromagnets are deenergized, the springs 22 and 23 retract the armature levers against a stop 25, and in this condition the guide pins 18 and 20 insure that both pawls are disengaged from ratchet wheel 9 as shown in the drawing. However, when either electromagnet is energized, its armature lever and pawl causes the ratchet wheel to move a step in a corresponding direction. Thus, when electromagnet 16 is energized, it rotates armature lever 12 in a clockwise direction about its pivot 14, causing pawl 10 to engage a tooth of ratchet wheel 9 and rotate the ratchet wheel and pinion 8 one step in a clockwise direction. And when electromagnet 17 is energized, the reverse action takes place, viz., armature lever 13 is rocked counterclockwise and ratchet wheel 9 is moved one step in a counterclockwise direction.

The energization of electromagnets 16 and 17 is governed by the action of light upon a photoelectric cell 30 which is mounted adjacent the iris opening or lens of the camera in such a position that it is pointed in the same direction and influenced by the same light conditions as the camera lens. I have found that a Weston Photronic (Central Scientific Co. No. 80915) cell, which transforms light directly into electrical energy, gives satisfactory results. The terminals of photoelectric cell 30 are connected by wires 31 and 32 to the opposite terminals of the movable armature coil 33 of a sensitive galvanometer relay 34. For this purpose, I have successfully used a Weston model 334 DC (Central Scientific Co. No. 80920) galvanometer. The galvanometer armature 33 carries a needle 35 which is positioned between two fixed contacts 36 and 37 and directionally biased by a small hair spring (not shown) toward contact 36. The voltage generated by the action of light on cell 30 is directly proportional to the intensity of the light and the deflection of the armature of galvanometer 34 is directly proportional to the voltage impressed thereon by cell 30. The spacing of contacts 36 and 37 is fixed, but they are mounted so that their relation to the movable contact or needle 35 may be changed in a manner and for a purpose to be later explained.

The fixed contacts 36 and 37 of galvanometer 34 are connected by wires 45—46 and 47—48 respectively to one terminal of the winding of relays 49 and 50; the other terminals of the windings of these relays are connected by wires 51—52—53 and 54—55—53, respectively, to one side of a battery 60. The other side of battery 60 is connected through a switch 61 and wires 62—63 to the movable-needle contact 35 of galvanometer 34. Thus, with switch 61 closed, the movement of needle 35 into engagement with contact 36 energizes relay 49 over the circuit 60—61—62—63—35—36—45—46—49—51—52—53 back to battery 60. And when the needle 35 engages contact 37, the relay 50 is energized over the circuit 60—61—62—63—35—37—47—48—50—54—55—53 back to battery 60.

Upon energization, relay 49 closes its contacts 70—71 to complete a circuit for electromagnet 16 over the path from battery 60 through switch 61 and over the path 64—71—70—72, the coil of magnet 16, conductor 73, the contacts 74—75 of magnet 16, wire 76 which interconnects contacts 75 and 77 of magnets 16 and 17 respectively, and wires 79—55—53 back to the battery. Contacts 74 and 78 are related to the armatures of electromagnets 16 and 17, respectively, in such a way that when either electromagnet is energized, the armature lever thereof causes the associated contact 74 or 78 to separate from companion contact 75 or 77 to interrupt whatever circuit might otherwise be completed therebetween. I have found that sufficient power to energize the power magnets and actuate the diaphragm of an ordinary amateur moving picture camera may be had from two commercial flashlight batteries.

The two spaced galvanometer contacts 36 and 37 are carried upon one arm of a bell crank lever 80, which is mounted on a fixed pivot 81. The other arm of lever 80 has a projection 82 bearing upon the peripheral surface of a cam disc 83 which is frictionally retained upon the cylindrical flange 84 of diaphragm ring 6 by suitable means, such as a pipe clamp 85. As shown, a sector of cam disc 83 is provided with an eccentric cam surface 86 which gradually inclines away from the axis so that as the cam disc moves counterclockwise, bell crank 80 is rocked counterclockwise about its pivot 81, and vice versa. Thus dependnt upon the inclination of cam 86 and the location of projection 82 thereupon, changes may be made in the angular position of bell crank lever 80 with a resultant change in the relation of the two galvanometer contacts 36—37 with respect to the movements of needle contact 35. A biasing spring 87 insures that projection 82 always bears firmly upon cam surface 86 so that the bell crank lever rocks clockwise or counterclockwise as the cam disc moves one way or the other, as will be presently explained, in response to changes in light intensity.

A worm 95 formed as a part of adjusting stem 96 is journaled in a bracket 97 carried by diaphragm ring 6 and meshes with a gear segment 98 formed in the periphery of cam disc 83. Rotation of stem 96 enables relative movements in both clockwise and counterclockwise directions between diaphragm ring 6 and cam disc 83. If desired, diaphragm ring 6 may be provided with a pointer 100 movable over a scale calibrated to the various iris openings, e. g., "F stops"; and likewise cam disc 83 may be equipped with a pointer 101 movable over a scale indicative, for example, of emulsion speeds of films. The adjusting stem 96 may, as desired, be located either inside the camera casing or outside of it, depending upon whether it is considered preferable to have the adjustment more or less accessible.

In order to prevent inductive discharges, which may be caused by the opening of the circuits of electromagnets 49 and 50, creating objectionable sparking at the galvanometer contacts, the coils of these magnets may be bridged by small condensers 103 and 104, respectively.

Switch 61, the closing of which initiates the operation of the automatic iris-opening adjuster, is preferably of the push button type. It may, as desired, be associated with the button which controls the feeding of the film and the action of the camera shutter so that both the camera and the adjuster start functioning at the same time; or this button may be independent of the camera control.

The operation will now be reviewed. If, upon the closing of switch 61, the effect of the light upon cell 30 is such that the voltage generated thereby is sufficient to enable the galvanometer armature to overcome the force exerted by its biasing spring so as to move the needle 35 out of engagement with the contact 36, but insufficient to enable the armature to move the needle into engagement with contact 37, no energizing circuit will be completed and the apparatus will remain inactive. Under such conditions, the iris opening is proper for the intensity of light existent.

Assuming now that the light intensity for some reason diminishes, for example, a cloud obscures the sun or the camera is moved to point toward a darker background. The diminished intensity of light causes the photoelectric cell to generate a lower voltage with the result that the hair spring acting upon armature 33 rotates it to swing needle 35 against contact 36. As soon as needle 35 engages contact 36, a circuit is completed for relay 49 from battery 60, switch 61, conductors 62—63, needle 35, contact 36, conductors 45—46, the coil of relay 49, and the conductors 51—52 and 53 back to the battery. Relay 49 is thereupon energized and its contacts 70—71 close. The closure of these contacts completes a power circuit for actuating magnet 16 over a circuit from the battery through switch 61, conductor 64, contacts 71—70, conductor 72, the coil of magnet 16, conductor 73, contacts 74—75, conductors 76—79—55 and 53 back to the battery. The resultant energization of magnet 16 performs two functions in sequence. First, it causes its armature lever 12 and pawl 10 to advance and rotate ratchet wheel 9 one clockwise step. This clockwise advance of ratchet wheel 9 causes pinion 8 and gear sector 7 to rotate diaphragm ring 6 through a corresponding arc in a counterclockwise direction, which opens the diaphragm a corresponding amount to let more light go through the camera lens. Second, it causes contacts 74—75 to separate to interrupt the circuit through magnet 16 even though the contacts 35—36 at the galvanometer remain together and as a result relay 49 remains energized. Thus, the magnet 16 effects its own deenergization after it has caused the ratchet wheel to advance a step, whereby its pawl 10 is retracted preparatory to producing another step, and continuance of step-by-step operation is insured until the proper diaphragm adjustment is made. In addition to the increment opening of the diaphragm, the step of counterclockwise movement of the diaphragm ring 6 also causes cam disc 83 to move counterclockwise through a small arc with the result that projection 82 of bell crank lever 80 contacts a higher portion of cam surface 86. The result is that bell crank lever 80 is rocked slightly in a counterclockwise direction to move contact 36 slightly in the same direction as the galvanometer spring is tending to move the armature and needle 35—i. e., to the left. And if this movement of contact 36 is sufficient to separate it from needle 35, no further operation ensues, because the diaphragm has been opened by the one step an amount sufficient to compensate for the decrease in light intnsity. However, if the light intensity affecting cell 30 is so low that the voltage generated therein is insufficient to balance the action of the coil spring acting upon the armature, and as a result needle 35 is swung to the left further than the first step movement of cam surface 86 has moved contact 36 in the same direction, then the engagement of needle 35 and contact 36 persists and relay 49 remains energized with its contacts 70—71 closed. Then, as soon as spring 22 of power magnet 16 has retracted armature lever 12 so that pawl 10 has disengaged ratchet wheel 9 and contacts 74—75 are again engaged, the energizing circuit for magnet 16 is re-established and thereby another step of diaphragm opening is produced and cam 86 presents a still higher level to projection 82—the latter condition resulting in contact 36 being moved an additional small increment to the left. Such step-by-step movements continue—the diaphragm opening being enlarged more and more—until the action of cam 86 is such that contact 36 has been moved beyond the range through which the galvanometer biasing spring can move needle 35 against the counter armature turning force of the voltage generated by cell 30 under a particular light intensity. Thereupon the separation of needle 35 and contact 36 opens the energizing circuit for relay 49 and the step-by-step diaphragm-opening movements cease because the opening corresponds to the existent light intensity.

If, on the other hand, the light intensity at any time increases, the higher voltage generated by photoelectric cell 30 causes the galvanometer needle 35 to engage contact 37. The engagement of contacts 35—37 completes a circuit through relay 50 over the circuit from battery 60, switch 61, conductor 62—63, needle 35, contact 37, conductors 47—48, the winding of relay 50 and conductors 54—55—53 back to the battery, with the result that its contacts 104—105 are closed. The closing of relay contacts 104—105 completes a circuit through power magnet 17 over the path from battery through switch 61, conductor 62, relay contacts 105—104, conductor 106, the winding of magnet 17, conductor 107, magnet contacts 78—77, and conductors 76—79—55—53 back to the battery. The energization of power magnet 17 produces two effects in sequence, just as has been described in connection with magnet 16. First, it causes pawl 11 to rotate ratchet wheel 9 in a counterclockwise direction; and second, it effects the separation of its contacts 77—78. The rotation of ratchet wheel 9 in a counterclockwise direction causes pinion 8 and gear segment 7 to rotate diaphragm ring 6 and cam disc 83 through a small arc in a clockwise direction. This movement of the diaphragm ring closes the iris opening a corresponding amount and the movement of cam disc 83 causes a lower part of cam surface 86 to be presented in contact with projection 82. Therefore, biasing spring 87 moves bell crank lever 80 to the right or in a clockwise direction, which tends to move contact 37 beyond the range of the deflection of needle 35 caused by the voltage generated in cell 30 under the particular light intensity then existent. Such increment closing of the diaphragm opening continues until the relation of cam 86 and projection 82 are such that contact 37 has been moved beyond the range through which the photoelectric cell voltage created by the present light intensity can swing needle 35, whereupon movement ceases, because the diaphragm opening then corresponds to the light intensity acting upon the photoelectric cell.

Thus, during the "taking" of a picture, the diaphragm opening will expand and contract automatically in accord with variations in light intensity just as long as control switch 61 remains closed.

Under some conditions, it may be desirable that the range of the expanding and contracting of the diaphragm opening be shifted. In other words that, for example, the minimum opening and also the maximum opening to which the automatic adjuster can move the diaphragm leaves be reduced in size. Such a change may be advisable to secure the best results if extremely high speed film is substituted for much less sensitive film. Or if, for example, color film is substituted for the more rapid black and white film, a shift in the opposite direction may be desirable to produce the most satisfactory pictures from an exposure standpoint. The desirable shift in the range of iris operation may be brought about by altering the relative positions of diaphragm ring 6 and cam disc 83. Such alterations of relative position are effected by turning the adjusting stem 96 in one direction or the other, depending upon whether the shift is to be toward smaller or larger diaphragm openings at opposite ends of the automatic expansion and contraction.

Of course, similar results may be obtained by the use of appropriate filters in lieu of such a mechanical shift of range.

By the use of sensitive low power relays in the galvanometer circuits to control heavier duty magnets deriving power from batteries—such as ordinary flashlight batteries—it is unnecessary to depend upon the photoelectric cell to deliver more than very small currents. This is a matter of importance with present day photoelectric cells of the voltage generating type because, as far as I am aware, they are incapable of delivering much power—enough satisfactorily to operate the usual camera-diaphragm mechanism. A further advantage flows from the interposition of extraneously powered mechanism—especially step-by-step mechanism—between the photoelectric cell control and the diaphragm, viz., a lessening of the tendency for constant variation in iris opening which might result in more or less fogging of the negatives. Thus, although the apparatus may be sufficiently sensitive to produce substantially uniform exposure, it is not so supersensitive as to be affected by light variations which are of no consequence as far as film exposure is concerned.

The automatic adjuster mechanism which I have herein specifically described, lends itself readily to construction as an attachment for diaphragm control of present day standard cameras, or it may be built in as an integral part of a special camera.

Having illustrated and explained the nature and a typical embodiment of my invention, what I claim and desire to secure by United States Letters Patent is as follows:

1. In a camera having the usual adjustable diaphragm to provide exposure openings of different sizes, the combination of a photoelectric cell responsive to the light conditions to which the camera lens is subject, a galvanometer connected to the cell so as to deflect in accord with variations of voltage generated by the cell under varying light intensities, step-by-step mechanism for actuating the camera diaphragm, said mechanism being responsive to deflections of the galvanometer, a source of power for actuating the step-by-step mechanism, cam means movable with the camera diaphragm, and means actuated by the cam means to cut off the source of power from the step-by-step mechanism when the diaphragm opening is proper for the existing light conditions.

2. In a camera having the usual adjustable diaphragm to provide exposure openings of different sizes, the combination of a photoelectric cell responsive to light conditions to which the camera lens is subject; a galvanometer having its armature connected to the cell so as to deflect in accord with variations in voltage induced by light intensity variations acting on the cell, and having a movable contact carried by the armature, and a pair of fixed contacts, one engageable by the movable contact when the armature deflects in opposite directions; means mounting said fixed contacts for movement together; a pair of relays, each in circuit with the movable contact and one of the fixed contacts of the galvanometer; a power circuit individual to and closable by each relay; an electromagnet in each power circuit; and diaphragm actuating mechanism operable in one direction by one electromagnet and in the opposite direction by the other electromagnet, said diaphragm actuating mechanism including cam means to actuate the contact mounting means to move the pair of galvanometer contacts in the same direction as the deflection of the galvanometer armature.

3. In a camera having the usual adjustable diaphragm to provide exposure openings of different sizes, the combination of step-by-step mechanism for expanding and contracting the diaphragm opening, a photoelectric cell responsive to the light conditions to which the camera lens is subject, a galvanometer connected to the cell so that the armature moves in accord with voltage changes created in the cell by light intensity changes, a contact carried by the galvanometer armature, a pair of spaced contacts, one on each side of the armature contact and selectively engageable thereby depending upon whether the light intensity acting on the cell increases or decreases, means mounting the pair of spaced contacts, means movable with the camera diaphragm and by the step-by-step mechanism for moving the contact mounting means in opposite directions, a relay connected to each of the spaced contacts, both being connected to the armature contact so that one or the other relay is energized depending upon which of the spaced contacts is engaged by the armature contact, a pair of operating electromagnets operatively associated with the step-by-step mechanism so as to operate the same in opposite directions, and a circuit between each relay and one of the operating electromagnets closable by the energization of the corresponding relay, and a source of electrical power for said circuits.

4. An automatic camera-diaphragm adjuster including a ratchet which expands or contracts the diaphragm opening when moved in opposite directions; a pair of electromagnets, each operating a pawl which moves the ratchet in one of its two directions of movement; a pair of relays, each having contacts for closing a circuit for one of the electromagnets; a galvanometer having an armature carrying a movable contact, and two relatively fixed contacts, one engageable by the movable contact upon deflection of the armature in opposite directions to close a circuit for one or the other of the two relays depending upon the direction of armature deflection; a photoelectric cell subject to the same light conditions as the camera lens and connected to the armature of the galvanometer so as to effect deflections thereof in accord with changes in light intensity; a mounting for the two relatively fixed contacts movable to shift the contacts in either direction relative to the armature contact; and means operatively connected with the contact mounting and with the ratchet to move the mounting in one direction or the other so as to alter the relation between the fixed and movable contacts of the galvanometer.

5. In a camera having the usual adjustable diaphragm to provide exposure openings of different sizes, the combination of an actuator movable in opposite directions for operating the diaphragm to change the size of the opening; a pair of electromagnets, one for moving the actuator in each direction; a photoelectric cell subject to the same light conditions as the camera lens; a galvanometer having a movable armature electrically connected to the cell, a movable contact carried by the armature, and a pair of relatively fixed contacts, one located on each side of the movable contact to be selectively engaged thereby depending upon the direction of deflection of the armature; means interposed between the galvanometer contacts and the electromagnets whereby deflections of the galvanometer armature in opposite directions can selectively effect energization of one or the other of the electromagnets; a mounting for the two fixed galvanometer contacts movable to shift their position in either direction relative to the fixed contact; and a cam movable with the diaphragm actuator and operatively associated with said mounting to move the latter in one direction or the other depending upon the direction of movement of the actuator so as to alter the relation between the fixed and movable contacts of the galvanometer.

6. In a camera having the usual adjustable diaphragm to provide exposure openings of different sizes, the combination of an actuator movable in opposite directions for operating the diaphragm to change the size of the opening; a pair of electromagnets, one for moving the actuator in each direction; a photoelectric cell subject to the same light conditions as the camera lens; a galvanometer having a movable armature electrically connected to the cell, a movable contact carried by the armature, and a pair of relatively fixed contacts, one located on each side of the movable contact to be selectively engaged thereby depending upon the direction of deflection of the armature; means interposed between the galvanometer contacts and the electromagnets whereby deflections of the galvanometer armature in opposite directions can selectively effect energization of one or the other of the electromagnets; a mounting for the two fixed galvanometer contacts movable to shift their position in either direction relative to the fixed contact; a cam movable with the diaphragm actuator and operatively associated with said mounting to move the latter in one direction or the other depending upon the direction of movement of the actuator and thereby causing the fixed contacts of the galvanometer to shift position relative to the movable contact; and means for altering the relation between the cam and the diaphragm actuator.

7. In a camera having the usual adjustable diaphragm to provide exposure openings of different sizes, the combination of a photo-electric cell responsive to light conditions to which the camera lens is subject, a galvanometer including a pair of relatively fixed but movable contacts and a movable contact, said galvanometer being connected to the cell so as to deflect in accord with variations in voltage induced by light changes acting upon the cell, mechanism for actuating the camera diaphragm to expand and contract the opening therethrough, electric circuit means including the fixed and movable contacts selectively responsive to deflections in opposite directions of the galvanometer and being connected to operate the diaphragm actuating mechanism, cam means movable with the camera diaphragm and by the diaphragm actuating mechanism, and a cam follower connected to the relatively fixed contacts and actuated by the cam to maintain in open condition the electric circuit means when the diaphragm opening is proper for the existing light conditions.

ARVID I. ERICSSON.